United States Patent
Cocchi (10) Patent No.: US 9,737,083 B2
(45) Date of Patent: Aug. 22, 2017

(54) DEVICE FOR TRANSFERRING LIQUID, SEMILIQUID OR POWDERED PRODUCTS AND SYSTEM FOR MIXING THE PRODUCTS

(71) Applicant: ALI S.p.A.—CARPIGIANI GROUP, Milan (IT)

(72) Inventor: Andrea Cocchi, Calderara di Reno (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days.

(21) Appl. No.: 14/706,112

(22) Filed: May 7, 2015

(65) Prior Publication Data
US 2015/0320078 A1 Nov. 12, 2015

(30) Foreign Application Priority Data
May 7, 2014 (IT) .............................. BO2014A0270

(51) Int. Cl.
A23G 9/08 (2006.01)
B67C 11/02 (2006.01)
B01F 15/02 (2006.01)
A23G 9/04 (2006.01)
A23G 9/22 (2006.01)

(52) U.S. Cl.
CPC .................. *A23G 9/08* (2013.01); *A23G 9/04* (2013.01); *A23G 9/22* (2013.01); *B01F 15/0201* (2013.01); *B67C 11/02* (2013.01); *B01F 2215/0021* (2013.01)

(58) Field of Classification Search
CPC ... A23G 9/04; A23G 9/08; A23G 9/22; B67C 11/02; B01F 15/0201; B01F 2215/0021
USPC ............. 141/9, 100, 105–107, 297, 301–302
See application file for complete search history.

(56) References Cited

U.S. PATENT DOCUMENTS

| | | | |
|---|---|---|---|
| 4,363,223 A | 12/1982 | Abbott | |
| 4,691,850 A * | 9/1987 | Kirschmann | B01F 13/1055 222/144.5 |
| 4,747,272 A * | 5/1988 | Howell | A23G 9/12 137/101.21 |
| 5,292,030 A | 3/1994 | Kateman et al. | |
| 5,433,967 A * | 7/1995 | Kateman | A23G 9/04 222/1 |
| 5,603,257 A * | 2/1997 | Kateman | A23G 9/04 62/306 |

(Continued)

FOREIGN PATENT DOCUMENTS

| EP | 2095720 | 9/2009 |
|---|---|---|
| EP | 2625964 | 8/2013 |

(Continued)

OTHER PUBLICATIONS

Italian Search Report dated Jan. 22, 2015 from counterpart App No. BO20140270.

*Primary Examiner* — Nicolas A Arnett
(74) *Attorney, Agent, or Firm* — Shuttleworth & Ingersoll, PLC; Timothy J. Klima (57) ABSTRACT

A device for transferring liquid, semiliquid or powdered basic products including: a main body designed to form a plurality of transfer channels defining respective conveying paths which are at least partly separate from one another, each including a respective inlet for a basic product, said main body including an outlet shared by said transfer channels.

13 Claims, 6 Drawing Sheets

(56) References Cited

U.S. PATENT DOCUMENTS

| | | | | |
|---|---|---|---|---|
| 5,806,550 | A * | 9/1998 | Frank | A23G 9/045 137/7 |
| 6,698,228 | B2 * | 3/2004 | Kateman | A23G 9/045 62/346 |
| 8,479,531 | B2 * | 7/2013 | Maeda | A23G 9/12 222/95 |
| 8,800,610 | B2 * | 8/2014 | Meinzinger | B67C 3/02 141/105 |
| 9,186,636 | B2 * | 11/2015 | Dong | B01F 7/1605 |
| 2003/0012864 | A1 | 1/2003 | Gerber | |
| 2005/0175767 | A1 * | 8/2005 | Gerber | A23G 9/045 426/665 |
| 2006/0134275 | A1 * | 6/2006 | Maeda | A23G 9/12 426/106 |
| 2007/0251260 | A1 * | 11/2007 | Baxter | A21B 7/00 62/342 |
| 2009/0217825 | A1 * | 9/2009 | Cocchi | A23G 9/28 99/455 |

FOREIGN PATENT DOCUMENTS

| | | |
|---|---|---|
| WO | 98/29328 | 7/1998 |
| WO | 2006/076733 | 7/2006 |

* cited by examiner

DEVICE FOR TRANSFERRING LIQUID, SEMILIQUID OR POWDERED PRODUCTS AND SYSTEM FOR MIXING THE PRODUCTS

This application claims priority to Italian Patent Application No. BO2014A000270 filed May 7, 2014, which application is incorporated by reference herein.

BACKGROUND OF THE INVENTION

This invention relates to a device for transferring liquid, semiliquid or powdered products and to a system for mixing the products.

Known in the ice cream machine industry are machines comprising a plurality of storage tanks containing basic products (liquid, semiliquid or powdered) and a hopper designed to receive the products from the tanks and to convey them towards a mixing chamber underneath.

A need felt by this industry is the need, when the basic product is changed, to prevent the new basic product from being mixed with the previously used basic product outside the mixing chamber.

SUMMARY OF THE INVENTION

This invention has for an aim to meet the above mentioned need.

One aim of this invention is to provide a device for transferring liquid, semiliquid or powdered basic products, applicable to machines for making liquid or semiliquid products, wherein mixing of the basic products being transferred is substantially prevented.

Another aim of the invention is to provide a device for transferring liquid, semiliquid or powdered basic products which does not necessitate cleaning and/or maintenance when the basic product/products being fed is/are changed A further aim of the invention is to provide a device for transferring liquid, semiliquid or powdered basic products which is easy to disassemble for cleaning or inspection purposes.

These aims are achieved by a device for transferring liquid, semiliquid or powdered basic products and a mixing system, forming the object of the invention and comprising the technical features described herein.

BRIEF DESCRIPTION OF THE DRAWINGS

The technical features, with reference to the above aims, are clearly described herein with advantages being apparent from the detailed description which follows, with reference to the accompanying drawings which illustrate a non-limiting example embodiment of the invention and in which.

DESCRIPTION OF THE PREFERRED EMBODIMENTS

With reference to the accompanying drawings, the numeral 1 denotes a device for transferring liquid, semiliquid or powdered basic products applicable to a machine 100 for making liquid and/or semiliquid products (preferably, but not necessarily, for making ice cream).

According to the invention, the transfer device 1 comprises a main body 2 configured to form a plurality of transfer channels C1, C2, C3, C4, C5 defining respective conveying paths which are at least partly separate from one another.

Each transfer channel (C1, C2, C3, C4, C5) has a respective inlet (I1, I2, I3, I4, I5) which is separate from that of the other transfer channels (C1, C2, C3, C4, C5).

The main body 2 has an outlet U shared by the transfer channels (C1, C2, C3, C4, C5), in which the selfsame channels (C1, C2, C3, C4, C5) converge.

Further, as already stated, the main body 2 has a plurality of inlets (I1, I2, I3, I4, I5), one for each transfer channel (C1, C2, C3, C4, C5).

Figure 2:
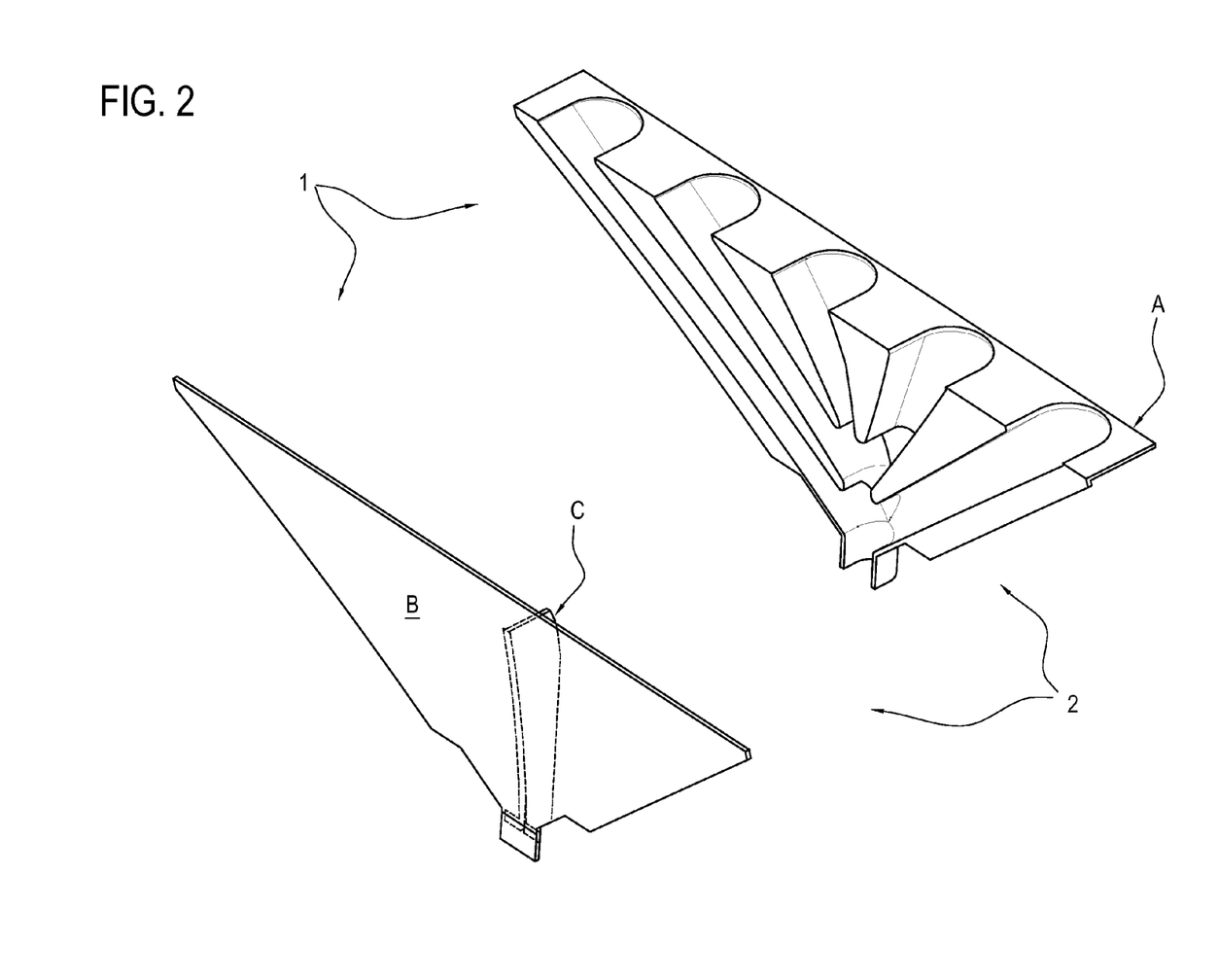
FIGS. 2 and 3 are perspective views of the transfer device in a disassembled condition.
Figure 3:
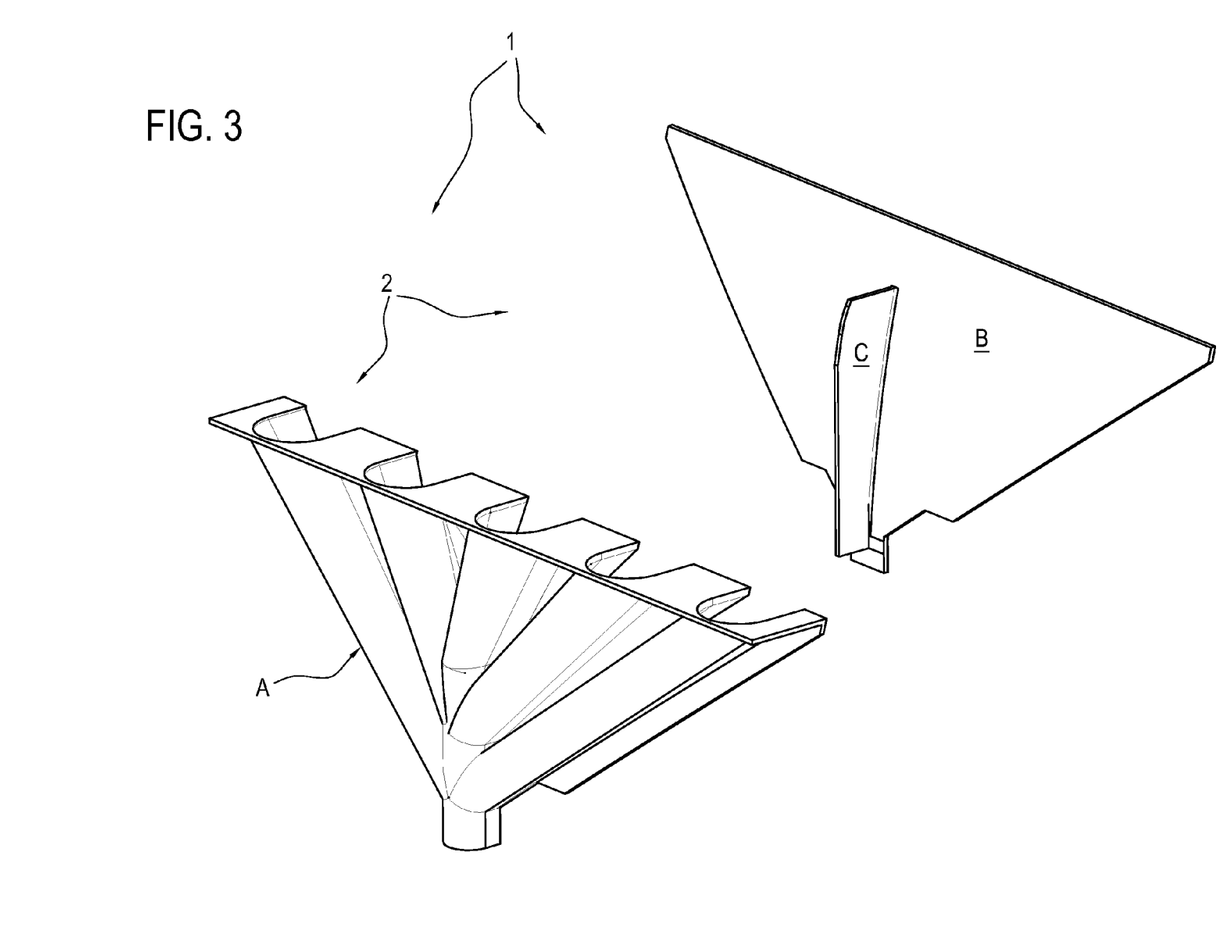
Figure 4:
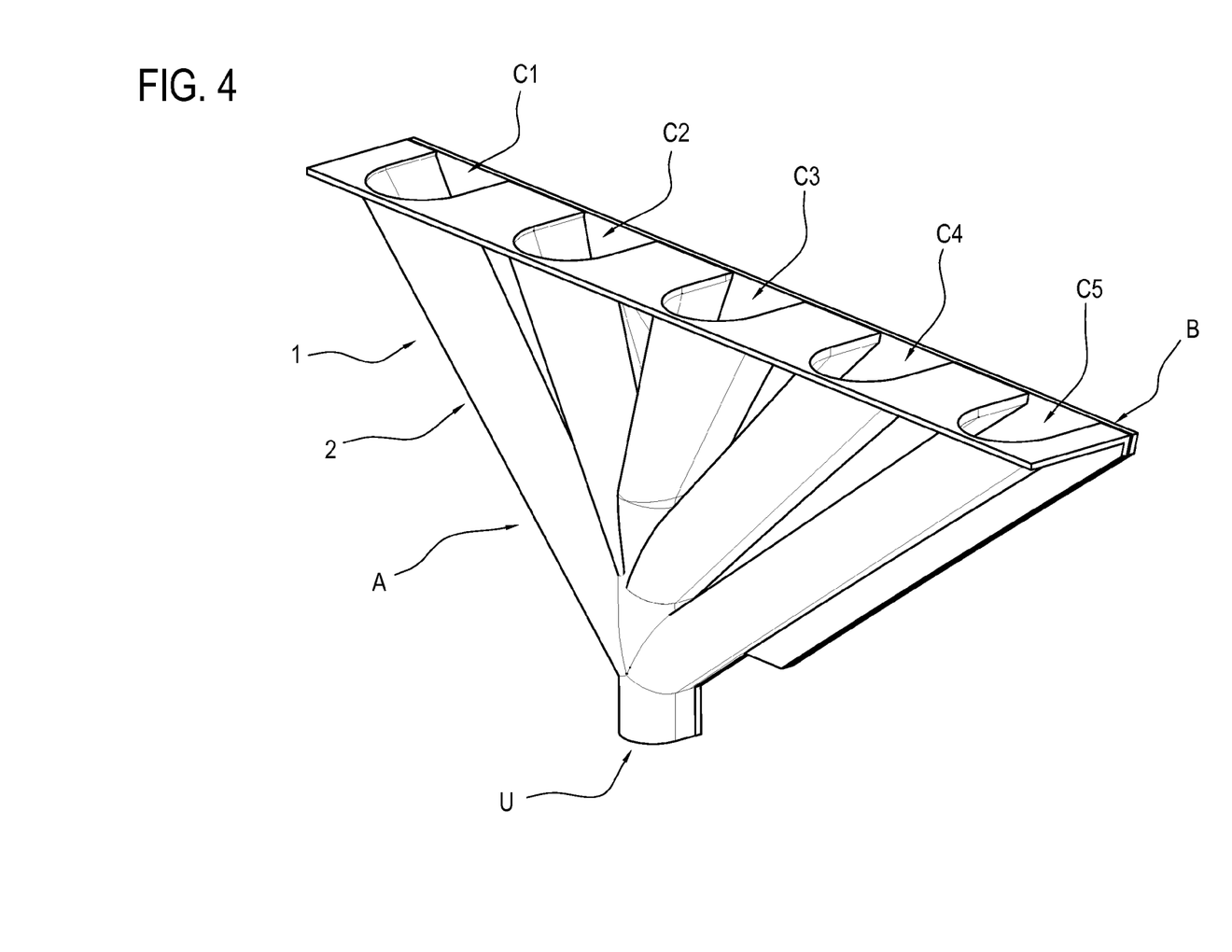
FIGS. 4 to 6 are perspective views of the transfer device in the assembled condition.
Figure 5:
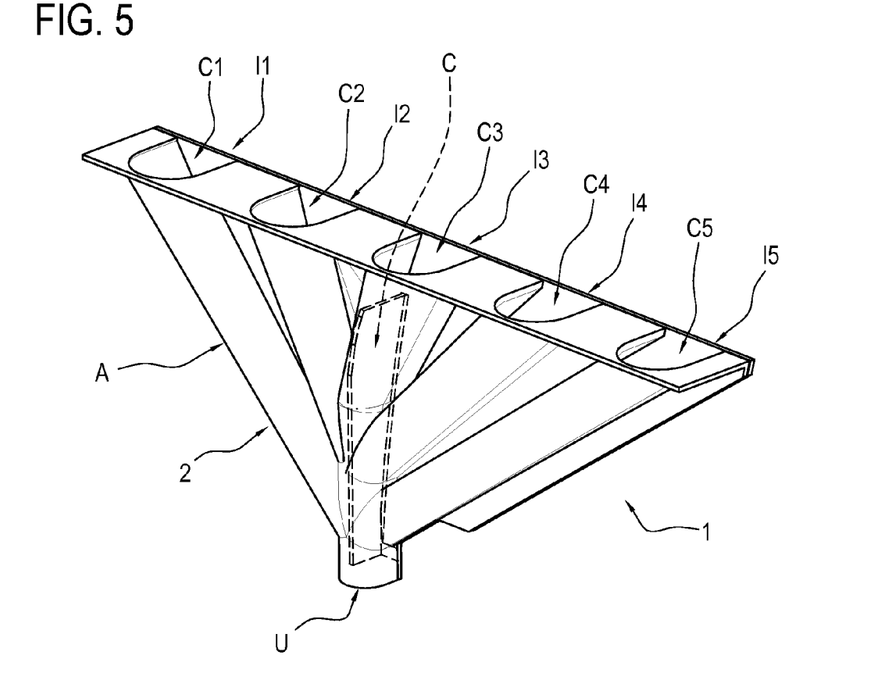
Figure 6:
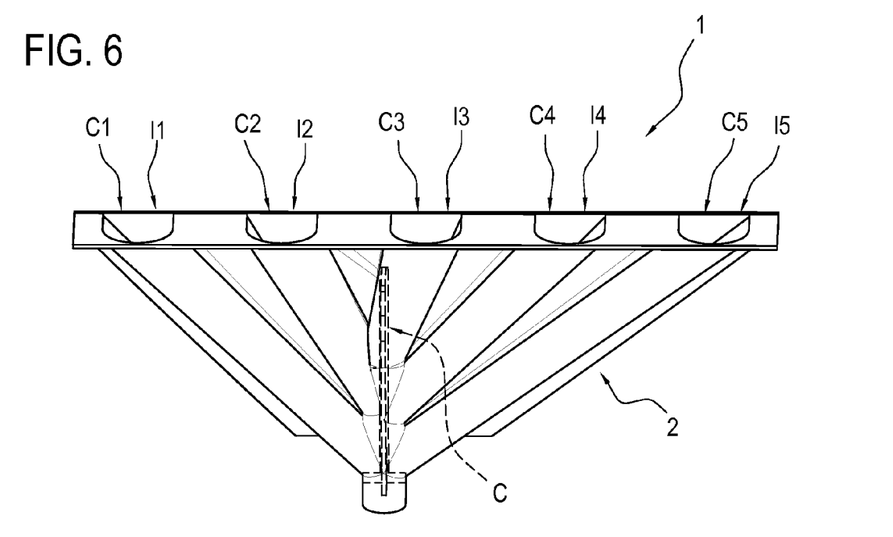

In the embodiment illustrated, the main body 2 comprises a rear wall A, in which seats are made which form the transfer channels (C1, C2, C3, C4, C5), and a second, front wall B which can be coupled to the rear wall A for closing the seats (and thereby forming the transfer channels (C1, C2, C3, C4, C5).

Preferably, the front wall B is a flat wall (which, in use, is positioned vertically).

With reference to the accompanying drawings, it should be noted that one of the channels of the plurality of transfer channels (C1, C2, C3, C4, C5) is positioned centrally and the other channels of the plurality of transfer channels (C1. C2, C3, C4, C5) are positioned on either side of that one of the plurality of transfer channels (C1, C2, C3, C4, C5) which is positioned centrally.

More specifically, it should be noted that a first portion of the other channels of the plurality of transfer channels (C1, C2, C3. C4, C5) is positioned in a right-hand region, whilst a second portion of the other channels of the plurality of transfer channels (C1, C2, C3, C4, C5) is positioned in a left-hand region, relative to that one of the plurality of transfer channels (C1, C2, C3, C4, C5).

According to another aspect, the device 1 preferably comprises a separating wall C which, in use, is associated with the main body 2 and positioned (inside the main body 2) in such a way that it affects the conveying path of at least some of the transfer channels (C1, C2, C3, C4, C5).

More preferably, the separating wall C is positioned in such a way that it affects the conveying path of all of the transfer channels (C1, C2, C3, C4, C5).

It should be noted that in the embodiment illustrated, the separating wall C is, in use, positioned substantially vertically.

It should also be noted that the separating wall C is positioned inside the main body 2.

It should be noted that in the embodiment illustrated, the separating wall C is fixed to the front wall B in such a way as to be integral with the front wall B.

It should be noted that the transfer channels (C1, C2, C3, C4, C5) are oriented in such a way that they are angled relative to a vertical direction. In other words, each of the channels is configured to define a main transfer direction which is inclined at an angle to a vertical direction.

The transfer channels (C1, C2, C3, C4, C5) are oriented in such a way that they are angled, the angle of inclination increasing from the centre towards the periphery of the main body 2.

It should be noted therefore that the peripheral transfer channels are inclined at a greater angle than the central transfer channels.

It should also be noted that the main body 2 has a tapered shape.

More specifically, in use, the main body 2 is tapered downwardly.

Also defined according to the invention is a system for mixing liquid, semi-liquid or powdered basic products (illustrated in FIG. 1), comprising:
- a plurality of storage tanks (S1, S2, S3, S4, S5) for liquid, semi-liquid or powdered basic products;
- a mixing chamber 4 for mixing said liquid, semi-liquid or powdered basic products, comprising a device 6 for introducing a basic liquid (preferably water) into the mixing chamber 4, and configured to allow mixing the basic liquid with the basic products;
- the transfer device 1 as described above, operatively interposed between the storage tanks (S1, S2, S3, S4, S5) and the mixing chamber 4 for transferring the basic products from the tanks (S1, S2, S3, S4, S5) to the mixing chamber 4.

Figure 1:
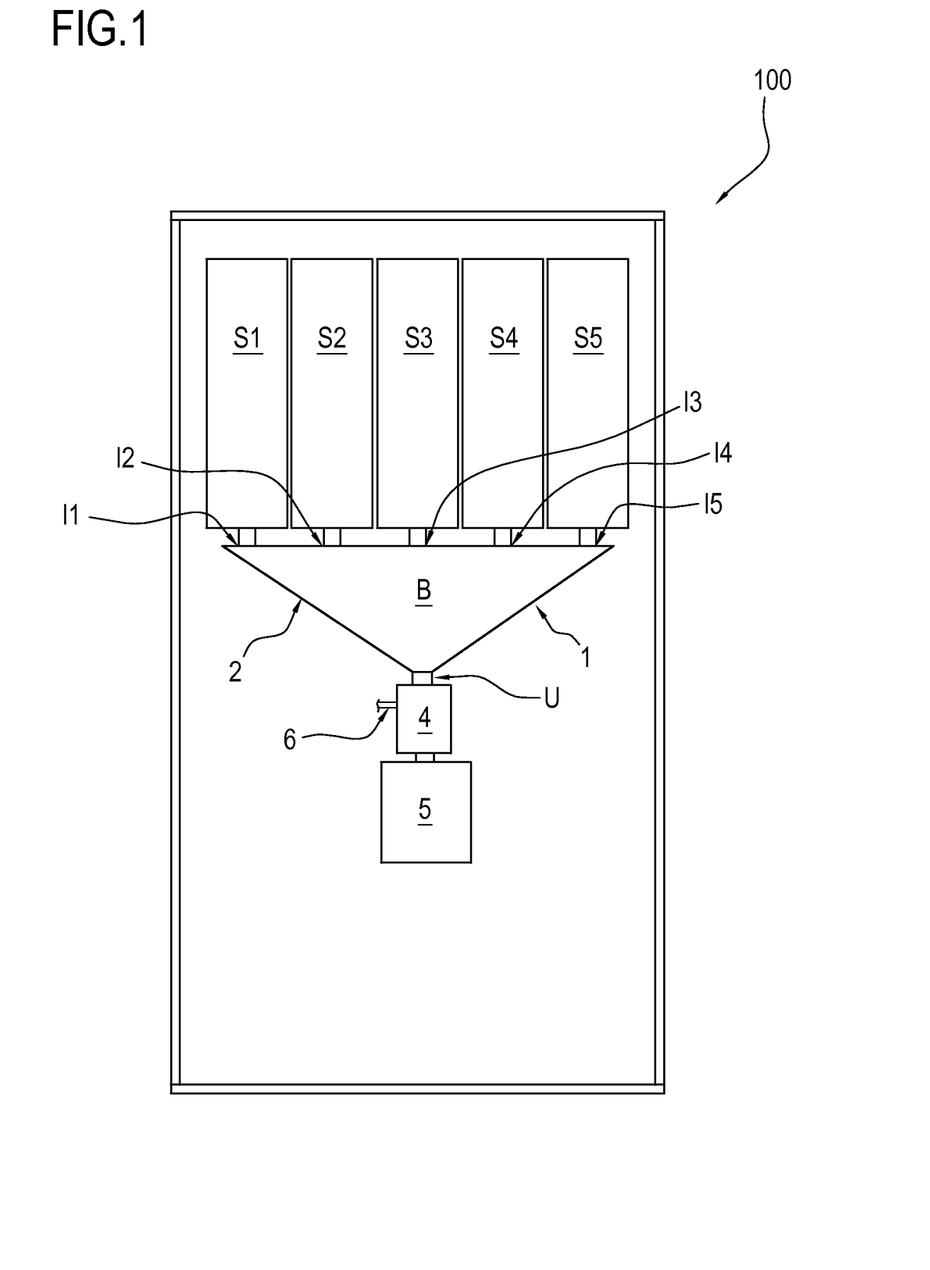
FIG. 1 is a schematic side view of a machine for making liquid and/or semiliquid products in which the transfer device of the invention is installed.

It should be noted that the mixing chamber 4 is provided with a basic products inlet which—in use—receives the basic products from the transfer device 1.

The mixing system forms part of a machine 100 (schematically illustrated in FIG. 1) for making liquid and/or semiliquid products.

The machine 100 comprises the mixing system described previously and further comprises:
- a processing chamber 5, equipped with a mixer and with thermal treatment means, operatively coupled with the mixing chamber (4) for receiving the basic products mixed with the basic liquid and for converting them into a liquid or semiliquid finished product.

It should be noted that the processing chamber 5 is a mixing and freezing chamber where the mixture being processed comprising the basic products, the basic liquid and, if necessary, other ingredients, is stirred and simultaneously cooled in such a way as to increase the volume of the mixture by incorporating air into it (mixing and freezing).

Below is a brief description of how the transfer device 1 operates and from which further advantageous technical features may be inferred.

It should be noted that to make a finished product (or "flavor") in the machine 100, one or more basic products must be used.

The basic products needed to make the required finished product are fed down from the respective tanks (S1, S2, S3, S4, S5) where they are stored.

More specifically, it should be noted that the inlet (I1, I2, I3, I4, I5) of each transfer channel (C1, C2, C3, C4, C5) is connected to one tank only in order to receive therefrom a predetermined basic product (liquid, semiliquid or powdered).

After being released by the respective tank, each basic product occupies one of the channels of the transfer device 1 and is gravity fed down the transfer path defined by the channel itself.

Thanks to the special structure of the transfer device 1, the mixing of one or more basic products occurs only inside the mixing chamber 4.

It should be noted, therefore, that the device 1 advantageously prevents different basic products from being mixed outside the mixing chamber 4.

Indeed, mixing outside the mixing chamber 4 is absolutely to be avoided especially when two different "flavors" (that is, different types of finished product) requiring the use of two different basic products are made directly one after the other in effect, in such a case, it is important for one "flavor" not to contain any residues of the basic product of another flavor made beforehand.

It should be noted that the separating wall C advantageously contributes to preventing the basic products, which are transferred through different transfer channels (C1, C2, C3, C4, C5) from being mixed inside the main body 2 of the transfer device 1.

Moreover, the fact that the separating wall C is vertical means that the basic products do not adhere to the wall C itself and, therefore, that no residues of the basic products remain inside the device 1.

Also, advantageously, the fact that the device 1 comprises two walls, a rear wall A and a front wall B, which can be coupled to each other, makes the device 1 easy to disassemble for cleaning purpose.

In effect, in order to clean the transfer channels (C1, C2, C3, C4, C5), it is sufficient to remove the rear wall B to access the seats which define the channels.

It should be noted that the transfer device 1 according to the invention is particularly easy to clean.

Figure 7:
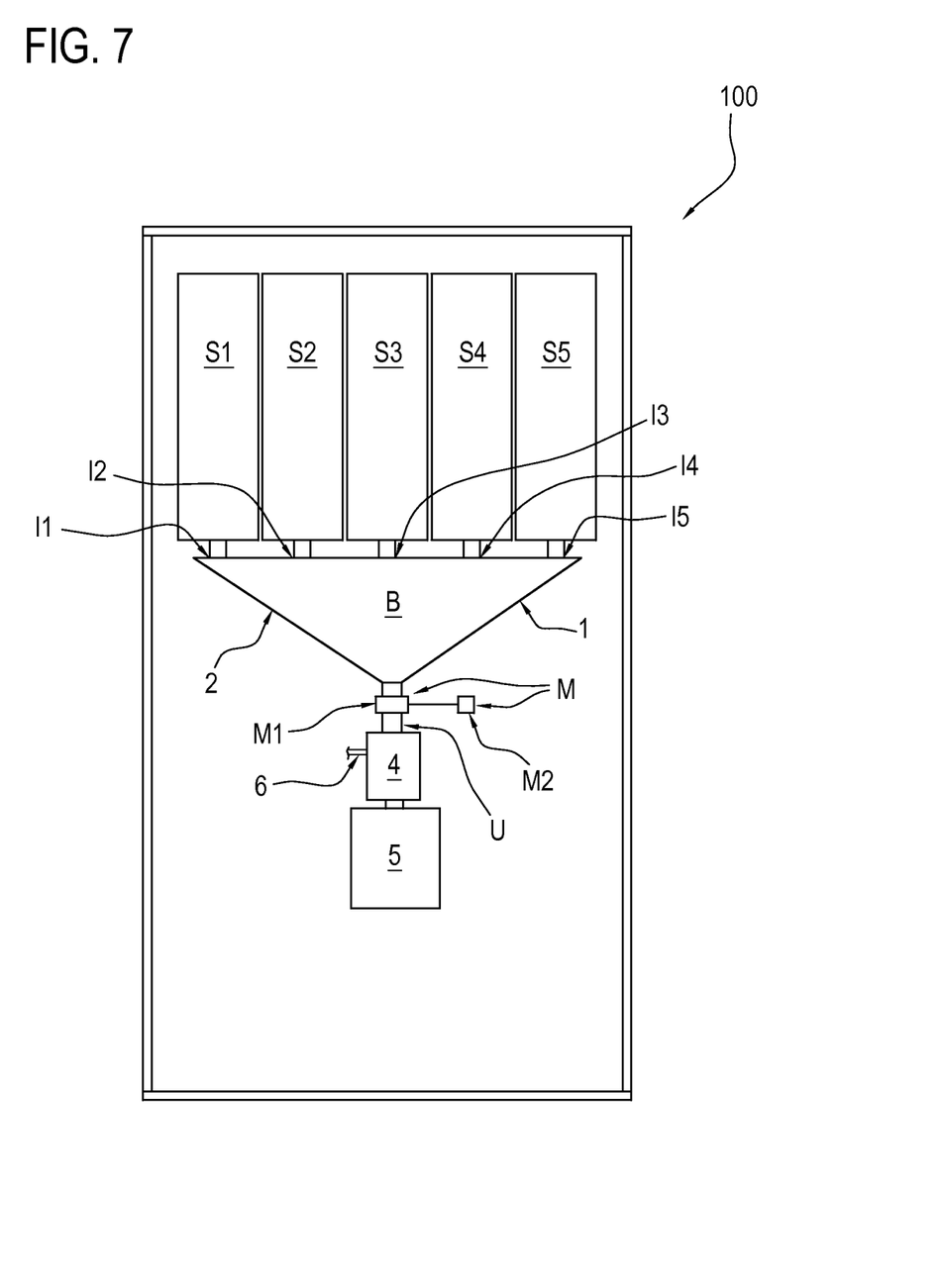
FIG. 7 is a schematic side view of a further embodiment of a machine for making liquid and/or semiliquid products in which the transfer device of the invention is installed.

According to another aspect, illustrated in the embodiment shown in FIG. 7, the mixing system further comprises a selective connection device M operatively interposed between the outlet U of the transfer device 1 and the inlet of the mixing chamber 4, the selective connection device being alternately switchable between two configurations (one configuration for making the connection and one configuration for breaking the connection), for alternately connecting or disconnecting the outlet U of the transfer device 1 and the inlet of the mixing chamber 4.

It should be noted that in the configuration for making the connection, the outlet U of the transfer device 1 and the inlet of the mixing chamber 4 are connected to each other to allow the basic products to pass freely from the transfer device 1 to the mixing chamber 4, while in the configuration for breaking the connection, the outlet U of the transfer device 1 and the inlet of the mixing chamber 4 are not connected to each other (thus preventing the basic products from passing freely from the transfer device 1 to the mixing chamber 4).

The purpose of the selective connection device M is to (automatically) allow breaking the connection between the outlet U of the transfer device 1 and the inlet (of the basic products) of the mixing chamber 4 so as to prevent the steam (produced by the hot water) fed into the mixing chamber 4 (during use and, in particular, during sterilization) from rising up back into the channels (C1,C2,C3,C4,C5) of the transfer device 1, reaching the tanks and moistening the basic products.

It should be noted that the selective connection device M is preferably controlled by a drive and control unit forming part of the mixing system.

It should be noted that the selective connection device M allows the steam produced in the mixing chamber 4 to be extracted by suction (without flowing through the channels C1,C2,C3,C4,C5 of the transfer device 1).

In use, therefore, when product is not required to be fed down through the channels C1,C2,C3,C4,C5 of the transfer device 1, the selective connection device is preferably in the configuration for breaking the connection so as to prevent the steam from rising up back towards the tanks of the basic products.

In a preferred embodiment, the selective connection device comprises a valve M1 (schematically illustrated in FIG. 7) operatively interposed between the outlet U of the transfer device 1 and the basic products inlet of the mixing chamber 4.

The valve M1 is switchable between a configuration for making the connection, where the outlet U of the transfer device 1 and the inlet of the mixing chamber 4 are connected to each other, and a configuration for breaking the connection, where the outlet U of the transfer device 1 and the inlet of the mixing chamber 4 are not connected to each other.

Preferably, the valve M1 may be of any type; more preferably, the valve is a ball valve or a slide valve.

Preferably, the valve M1 is driven by an actuator M2 (schematically illustrated in FIG. 7).

Preferably, the actuator is an electric actuator.

Still more preferably, the electric actuator is an electric motor.

What is claimed is:

1. A transfer device for transferring liquid, semiliquid or powdered basic products, comprising:
    a main body including a plurality of transfer channels defining respective conveying paths which are at least partly separate from one another, the main body including a plurality of inlets, one for each of the plurality of transfer channels, the main body comprising an outlet shared by the plurality of transfer channels, in which the plurality of transfer channels converge;
    wherein the main body comprises a rear wall, in which seats are made which form the plurality of transfer channels, and a separate front wall reversibly couplable with the rear wall for closing the seats.

2. The transfer device according to claim 1, wherein the front wall is a flat wall.

3. The transfer device according to claim 1, wherein one of the plurality of transfer channels is positioned centrally and the other of the plurality of transfer channels are positioned on either side of the one of the plurality of transfer channels which is positioned centrally.

4. The transfer device according to claim 3, wherein a first portion of the other of the plurality of transfer channels is positioned in a right-hand region, whilst a second portion of the other of the plurality of transfer channels is positioned in a left-hand region, relative to said one of the plurality of transfer channels.

5. The transfer device according to claim 1, and further comprising a separating wall positioned in the main body and extending between the rear wall and the front wall to affect a conveying path of at least some of the plurality of transfer channels.

6. The transfer device according to claim 5, wherein the separating wall is, in use, positioned substantially vertically.

7. The transfer device according to claim 1, and further comprising a separating wall positioned in the main body and extending between the rear wall and the front we to affect a conveying path of all of the plurality of transfer channels.

8. The transfer device according to claim 1, wherein the main body comprises:
    a separating wall positioned in the main body and extending between the rear wall and the front wall to affect a conveying path of at least some of the plurality of transfer channels,
    wherein the separating wall is secured to the front wall.

9. The transfer device according to claim 1, wherein the plurality of transfer channels are oriented to be angled relative to a vertical direction.

10. The transfer device according to claim 9, wherein the plurality of transfer channels are oriented to be angled, with an angle of inclination of the plurality of transfer channels increasing towards a periphery of the main body.

11. A system for mixing liquid, semiliquid or powdered basic products, comprising:
    a plurality of storage tanks for liquid, semiliquid or powdered basic products;
    a mixing chamber for mixing the liquid, semiliquid or powdered basic products, comprising a device for introducing a basic liquid into the mixing chamber and allowing mixing of the basic liquid with the liquid, semiliquid or powdered basic products;
    a transfer device according to claim 1, operatively interposed between the plurality of storage tanks and the mixing chamber for transferring the liquid, semiliquid or powdered basic products from the storage tanks to the mixing chamber.

12. The system according to claim 11, and further comprising a selective connection device operatively interposed between an outlet of the transfer device and a basic products inlet of the mixing chamber, the selective connection device being alternately switchable between two configurations, for alternately connecting or disconnecting the outlet of the transfer device and the basic products inlet of the mixing chamber.

13. A machine for making liquid or semiliquid products, comprising the mixing system of claim 12, and further comprising:
    a processing chamber, including a mixer and a thermal treatment system, operatively coupled with the mixing chamber for receiving the liquid, semiliquid or powdered basic products mixed with the basic liquid and for converting them into a liquid or semiliquid finished product.

* * * * *